United States Patent Office 3,532,493
Patented Oct. 6, 1970

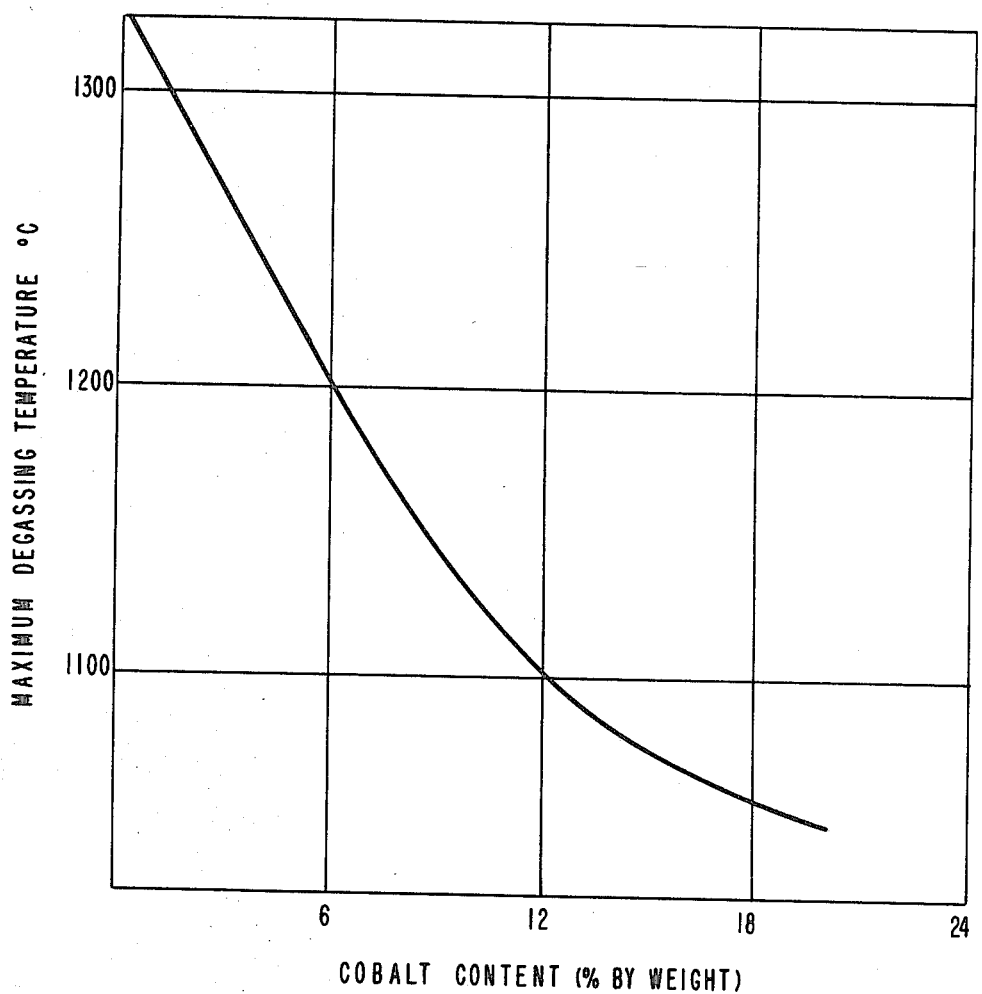

3,532,493
RAPID SINTERING OF POROUS COMPACTS
Dong M. Chay, Wilmington, Del., assignor to E. I. du Pont de Nemours and Company, Wilmington, Del., a corporation of Delaware
Filed July 31, 1969, Ser. No. 846,525
Int. Cl. C22c 29/00
U.S. Cl. 75—204           10 Claims

ABSTRACT OF THE DISCLOSURE

Cobalt-bonded tungsten carbide bodies are prepared by a process comprising the steps:
(1) preparing a finely divided intimate powder mixture of cobalt and tungsten carbide;
(2) cold-pressing the powder mixture;
(3) degassing;
(4) rapidly heating to a sintering temperature;
(5) sintering to a dense body; and
(6) rapidly cooling.

The process can be used for preparing fine-grained, dense compacts of high strengths and toughness. The products are useful as cutting tools.

BACKGROUND OF THE INVENTION

Conventional procedures for cold-pressing and sintering cobalt/tungsten carbide compositions are described in U.S. Pat. No. 1,812,811. This basic procedure is still widely used in commercial production of cemented carbides.

Some modifications of this basic process include "pre-sintering" to remove wax as disclosed by R. H. Forster in Australian Institute of Metals Journal 8 405–414 (1963) No. 4; or for other reasons as disclosed in Austrian Pat. No. 171,413.

The variety of stages in the sintering process are detailed in accounts such as "The Physics of Powder Metallurgy," Chapter IX, pp. 278–294 by R. Kieffer, McGraw-Hill Book Company, Inc., 1951, or Schwarzkopf and Kieffers "Cemented Carbides," MacMillan Company, 1960.

I have discovered that cobalt-bonded tungsten carbide with an improved combination of strength and hardness can be prepared by cold-pressing a finely divided powder mixture and then sintering the compact by heating it rapidly, holding at maximum temperature a very short time and then cooling rapidly. The products of this process will show greater strength for a given hardness than bodies of the same chemical composition made by a traditional sintering process.

SUMMARY

In summary, this invention is directed to a process for making dense, strong bodies of cobalt and tungsten carbide comprising the steps of:
(1) preparing an intimate powder mixture of cobalt and tungsten carbide having a specific surface area of from 1 to 7 square meters per gram and an oxygen content of less than 1.0% by weight, said mixture consisting essentially of:
(a) 3 to 25% by weight of cobalt having an average particle size in the range of from 0.1 to 5 microns and
(b) 97 to 75% by weight of tungsten carbide having an average particle size in the range of from 0.1 to 2 microns;
(2) compacting said mixture under a pressure of from 1,000 to 100,000 p.s.i. to a coherent body having a density in excess of 30% of theoretical;
(3) degassing the body under vacuum by raising the temperature from the cold-pressing temperature to a temperature in the range of from 1100° C. to a temperature just below the eutectic temperature of the composition, at a rate of not more than 10° C. per minute;
(4) thereafter, raising the temperature to $T_s$ at a rate of $R_s$ while maintaining the body under vacuum, where:

$$T_s = \left[\left(\frac{6.500 - \log_{10}(M - 0.300)}{0.0039}\right) \pm 50\right] \text{° C.}$$

$R_s = [(1.25M + 45) \pm 10]$ ° C. per minute and
$M$ = the percent by weight of cobalt based on the weight of cobalt and tungsten carbide;
(5) maintaining, under vacuum, temperature $T_s$ for a period of time not exceeding 10 minutes; and
(6) cooling the body from $T_s$ to 800° C. in an oxygen-free atmosphere in a period of time of from 5 to 30 minutes.

BRIEF DESCRIPTION OF THE DRAWING

The drawing represents a graph of the maximum degassing temperature for any given cobalt/tungsten carbide mixture, as a function of the percent by weight of cobalt in the mixture.

DESCRIPTION OF THE INVENTION

Starting powders

The powders used in the first step of the present process are finely divided mixtures of 3 to 25% by weight, preferably 6 to 20%, of cobalt and 75 to 97% by weight, preferably 80 to 94%, of tungsten carbide. The mixtures can be made from cobalt powders having an average ultimate particle size of from 0.1 to 5 microns, preferably 0.1 to 1 micron, and tungsten carbide powders having an average ultimate particle size of from 0.1 to 2 microns, preferably 0.1 to 1.0 micron. The specific surface area of the cobalt-tungsten carbide starting powders should be 1 to 7 square meters per gram, preferably 2 to 5 square meters per gram. The best results are obtained using powders having specific surface areas in the range of 2 to 3 square meters per gram.

Powders in which the particles are aggregated can be used in the present process provided the aggregates are less than 50 microns and preferably less than 10 microns in their maximum dimension. The weaker the aggregates, the more suitable they are for use in the present process. Powders which are partially sintered to form strong aggregates generally are not effective in the present process because they are difficult to cold press to a density in excess of 30% of theoretical and this gives rise to pores in the final sintered bodies. The degree of aggregation and the size of the aggregates can be determined from optical or electron micrographs on the powders. Also if the powders can be cold-pressed to a density more than 30%, and preferably more than 50% of theoretical density, the state of aggregation is satisfactory for the process of this invention. Powders which are substantially nonaggregated are most suited to the purpose of the invention. Most commercially available powders fall into this latter category.

Since the process of this invention is directed to a rapid sintering process and to the production of a fine grain, dense body, it is preferred that fine starting powder be used. However, the powder must not be excessively fine, for it can cause one or more of the following difficulties:

(a) Due to the large surface area associated with a fine particle size, it is difficult to obtain a high cold-pressed density. To ensure complete densification by the process of this invention, the cold pressed density should be greater than 30%, preferably greater than 50%, and most preferably greater than 60% of the theoretical density. The compacting pressures required to achieve these densities are in the range of 1,000 to 100,000 p.s.i.

(b) A cold-pressed body with a very fine particle size shrinks so much and so rapidly, that during sintering it tends to pull itself apart, creating defects in the body such as many small cracks.

(c) The finer the powder, the more readily it adsorbs moisture and oxygen from the air. Powders suitable for cold-pressing should have an oxygen content of less than 1%, preferably less than 0.5% and most preferably less than 0.3%. If the oxygen content is too high it can lead to loss of carbon and excessive degassing, which can in turn lead to holes or cracks. Moreover, the final composition may be carbon deficient, which sometimes results in inferior properties, due, for example, to the presence of undesirable phases, such as eta phase, $Co_3W_3C$.

(d) Excessively fine particles are extremely active due to their large surface area, and growth occurs very rapidly and is difficult to control; thus, undesirably large grains can result.

THE PROCESS

Step 1

The cobalt-tungsten carbide mixtures from which the bodies of the invention are made are prepared by mechanical milling procedures. In addition to particle size reduction, a further purpose of the milling process is to distribute the cobalt over the surface of the tungsten carbide particles, thus obtaining a very intimate mixture of the two components.

There are many types of equipment known to the art such as ball mills, vibratory mills, and jet-mills which may be used to accomplish the milling. Ball-milling in rotary mills is one of the preferred methods. The components are charged to a steel ball mill, along with a suitable milling medium, such as small cylinders of cobalt-bonded tungsten carbide and an inert liquid such as acetone or a hydrocarbon oil of medium volatility, and milled together for a period of time, usually 1–5 days, depending upon the degree of comminution that is required. If it is desired to achieve more particle size reduction or disaggregation of the tungsten carbide starting material, it is often advantageous to mill the tungsten carbide for several days before adding the cobalt and then milling the mixture for an additional 1 or 2 days to distribute the cobalt over the finely milled tungsten carbide. Another desirable procedure consists of charging the tungsten carbide and cobalt powders to a vibratory mill using the same type of milling medium and fluid as in the previously described rotary ball mills. Uusually shorter milling times are required with a vibratory mill than with a rotary mill to achieve a similar degree of comminution and mixing.

The fluid used in the milling operation is removed from the powder, usually by distillation. The final drying stages are preferably performed under a vacuum, such as 0.5 torr, and the dried powder is then screened through a U.S. Standard 70 mesh screen. The specific surface area of the powders should be in the range of 1 to 7 square meters per gram and preferably 2 to 5 square meters per gram and the best results are obtained with powders having specific surface areas in the range of 2 to 3 square meters per gram. The more finely divided powders are readily oxidized on contact with the atmosphere and may even be pyrophoric. Such powders can be deactivated after drying and made suitable for handling in the atmosphere by first exposing them to an inert atmosphere such as nitrogen and then gradually introducing oxygen into the inert atmosphere to provide a protective oxide coating. However, the resulting powders should contain less than 1%, preferably less than 0.5% and most preferably less than 0.3% oxygen. For the very finest powders with specific surface areas approaching 7 square meters per gram, even this treatment may not deactivate the powder or the final oxygen content may be too high, and such powders have to be handled throughout the subsequent compacting and sintering operations under an inert atmosphere.

Step 2

The second step consists of cold-pressing the cobalt-tungsten carbide mixtures to a density in excess of 30% of theoretical. The cold-pressed body must be essentially free of voids larger than about ten microns in size, with the size of the voids being smaller the greater the density of the cold-pressed body. Thus a body with a cold-pressed bulk density of 60% contains few voids larger than five microns. Larger voids remain even after the sintering step thus resulting in weak bodies being obtained. Accordingly, the cold-pressed bulk density should be 30%, preferably 50%, and more preferably 60%, of theoretical.

Dry powders are made into suitably shaped billets such as in the form of round rods, square bars, or pieces of more intricate shape, by loading them into a suitable mold and compacting them under pressure. The molds may be made from steel, cobalt-bonded tungsten carbide, or other suitably strong material. After charging the desired amount of powder and inserting the pistons, the powder is compacted by applying pressures of from 1,000 to 20,000 p.s.i. to the sample. This compaction can be carried out in conventional, repetitive presses of the type now used in the carbide industry. Alternatively, the powder may be formed into a desired shape using an isostatic press. In such a press the powder is usually loaded into a rubber mold having the required shaped cavity, and after sealing the mold, it is placed in a hydrostatic pressure chamber and subjected to pressures of 40,000 to 100,000 p.s.i. to produce a coherent body. The cold pressing can be accomplished at room temperature or can be done at temperatures as high as 100–200° C.

Step 3

The cold pressed billet is then transferred to a high-vacuum furnace capable of being heated rapidly to 1600° C. either by electrical resistance or induction heating. The billets can be supported in alumina trays or on a layer of aluminum oxide powder contained in a graphite tray or any other inert medium which will not interact with the cobalt or tungsten carbide at sintering temperatures.

After being placed in a furnace, the coherent body is degassed by raising the temperature under a high vacuum, the pressure preferably being less than 0.1 torr. Very fine particles contain an extraordinary amount of absorbed vapors which will develop internal pressure and crack the structure unless ample time is allowed for the vapors to escape through the very fine pores. In order to degas the body, it is heated from room temperature at a rate not in excess of 10° C. per minute to a temperature in the range of from 1100° to just below the eutectic temperature of the composition under a high vacuum, the pressure preferably being less than 0.1 torr. The actual temperature to which the coherent body will be heated depends on the composition, for example 1100° C. is preferred for compositions containing 12% or more of cobalt, whereas 1200° C. is preferred for compositions containing 6% of cobalt. Higher temperatures can be used provided they do not exceed the eutectic temperature for a particular composition. As sintering begins above about 1100° C., the temperature throughout the billet must be kept very uniform. If the outside becomes hotter and shrinks faster than the inside, flaws develop. With very fine-grained pressed powders which begin to sinter at unusually low temperature, uniformity of temperature throughout the billet is highly critical.

The maximum degassing temperature, i.e. the temperature below which the sample is degassed during the slow heatup, can be determined for any given cobalt-tungsten carbide mixture by reference to the accompanying drawing wherein a graph of the maximum degassing temperature is plotted as a function of percent cobalt.

The specific surface area of the body after degassing should preferably be not more than 90% of the specific surface area of the powder from which the body was cold pressed, more preferably not more than 70%, and most preferably not more than 50%. Further, after degassing, the bulk density should be greater than 60% of theoretical, and preferably greater than 70% of theoretical.

Step 4

Step 4 in the present process is a critical step. After degassing, the coherent body is rapidly heated to the sintering temperature [$T_s$], while maintaining a high vacuum, the pressure preferably being less than 0.1 torr. Conventional sintering of tungsten carbide bodies containing 3 to 25 percent by weight cobalt is carried out in the range from 1250° C. to 1500° C. over a period of time from a half to several hours to ensure complete densification. In the process of the present invention, sintering is carried out by raising the temperature to the maximum sintering temperature in a few minutes.

The sintering temperature [$T_s$] is determined according to the equation:

$$T_s = \left[\left(\frac{6.500 - \log_{10}(M - 0.300)}{0.0039}\right) \pm 50\right]° C.$$

wherein M is the weight percent of cobalt based on the total amount of cobalt and tungsten carbide. The equation expresses the permissible range of $T_s$. The rate at which the coherent bodies are heated to $T_s$ is determined by the equation:

$$R_s = [(1.25M + 45) \pm 10]° C. \text{ per minute}$$

wherein $R_s$ = heating rate in ° C./min., and M has the same meaning defined above.

Step 5

The fifth step of the process merely involves holding the sintering temperature, $T_s$, for a period of time ranging from zero to 10 minutes, preferably from 2 to 5 minutes, while maintaining a high vacuum, the pressure preferably being less than 0.1 torr. It is important that the time period at which the body is held at $T_s$ not exceed 10 minutes in order to minimize the grain growth of tungsten carbide and cobalt.

Step 6

Another critical step in the present process is the cooling step after sintering. The sintered body should be cooled rapidly from the sintering temperature to about 800° C. within a period of 5 minutes to 30 minutes, while maintaining an oxygen-free environment. Preferably, the product should be cooled from the sintering temperature to 800° C. within a period of 5 minutes to 10 minutes. The product is then cooled from 800° C. to room temperature in a conventional manner, i.e. cooled at the rate of about 3 to 5° C. per minute and protection from the atmosphere is not essential at this stage.

After the bodies have cooled they are recovered and used for their intended purpose.

The invention will be better understood by reference to the following illustrative examples, wherein parts and percentages are by weight unless otherwise noted.

EXAMPLE 1

This example describes the preparation of a dense body of tungsten carbide bonded with 12% cobalt, possessing high strength and hardness and having an extremely fine grain size and low porosity, made by preparing a very finely divided intimate mixture of cobalt and tungsten carbide powders, cold pressing and sintering under conditions hereinafter described.

A one-gallon steel mill is charged with 14,000 parts of 6% cobalt-bonded tungsten carbide grinding cylinders ¼ inch long and ¼ inch in diameter, which have been previously conditioned by tumbling in acetone in the mill for two weeks in order to wear off all sharp corners and until the rate of wear under the milling conditions used is less than about 10 grams in 5 days.

Into the mill is also charged 1800 parts of fine tungsten carbide powder and 1160 parts of acetone. The tungsten carbide powder has a specific surface area as determined by nitrogen adsorption of 0.66 square meter per gram. As measured by X-ray line broadening, the average crystallite size is 370 millimicrons. Examination of the powder with an electron microscope reveals dense aggregates in the size range of 2 to 10 microns, the aggregates being comprised of tungsten carbide grains in the size range from 0.5 to 2 microns, with an average size of about half a micron. Chemical analysis of this powder is 93.2% tungsten, 6.32% total carbon, and less than 0.1% by weight each of oxygen and free carbon, respectively.

The charge occupies about half of the volume of the mill. Milling is carried out by rotating the mill at 80 revolutions per minute, the lid being tightly sealed to prevent loss of contents. Milling is continued for 48 hours. The mill is then permitted to cool and is opened, and 250 parts of cobalt powder are added. The cobalt powder has a specific surface area of 0.7 square meter per gram and an average grain size of about one micron. The mill is closed and milling is resumed for 72 hours, at a rate of 80 r.p.m. The mill is then permitted to cool, and the lid is replaced by a discharge cover and fitted with inlet and outlet connections, so that the contents are transferred to a container maintained in an atmosphere of nitrogen throughout the operation. Three portions of aceton of 316 parts each are used to wash out the mill. The solids in the receiver flask are allowed to settle, and the bulk of the acetone is siphoned off. The flask is then evacuated and warmed from the exterior to distill off the acetone, and the temperature of the flask after the distillation is completed is brought to 125° C. and contents maintained under a vacuum of less than a tenth of a millimeter of mercury for about 4 hours. The flask is cooled and filled with pure nitrogen and transferred to a nitrogen-filled glove box. In this inert environment, the solids are removed from the flask and screened through a U.S. Standard sieve having 70 meters per inch. Analysis of the powder, which is maintained continuously under nitrogen, is 5.42% total carbon, 0.09% free carbon, 0.31% oxygen, 12.76% cobalt, the remainder being tungsten.

The particle size of this powder is characterized as follows. The specific surface area by nitrogen adsorption is 2.8 square meters per gram. After extracting the cobalt with hot concentrated hydrochloric acid and washing and drying the tungsten carbide, the specific surface area is 3.5 square meters per gram.

The powder is loaded in an inert atmosphere into ⅞-inch square cross section rubber molds. The molds are made of thin-walled rubber, with a wall thickness of about 1/16 inch, the molds being about 4 inches long and made with one end closed. After placing the powder inside, the other end is sealed tightly using a rubber stopper held in place with a spring clamp. The molds are evacuated by means of a hypodermic needle connected to a vacuum, while tapping the mold. The mold is then placed in a hydrostatic pressure chamber and subjected to a pressure of 60,000 pounds per square inch, the pressure transmitting medium being water. Pressure is continuously applied for 5 minutes. The pressure is then released slowly over a period of two minutes to atmospheric. The sample is then removed from the mold in a nitrogen atmosphere.

The cold-pressed billets are placed in pure aluminum oxide trays in which they are heated and sintered in a high vacuum resistance heated furnace.

The rate of heating of the billet is very slow and continuous. Air is pumped from the furnace cavity over a period of 10 minutes until a pressure of $1 \times 10^{-4}$ torr is obtained. The furnace temperature is raised from 30° to 1100° C. at a uniform rate of 5° C. per minute. Upon reaching 1100° C., the heating rate is increased, and a temperature of 1400° C. is obtained within six minutes. The sample is heated at 1400° C. for a total of five minutes under a pressure of $0.2 \times 10^{-4}$ torr. The furnace is then cooled, and the temperature of the sample is reduced from 1400° C. to 800° C. in four minutes.

The resulting sintered billet has a transverse rupture strength of 600,000 p.s.i. and a hardness of 90.8 Rockwell A. Examination of the microstructure shows extremely low porosity, with an A-1 porosity on the ASTM porosity scale. The cobalt distribution is very uniform and no eta phase ($Co_3W_3C$) is observed. The tungsten carbide grains are substantially all smaller than one micron, are generally equiaxed, and the mean grain size is 0.7 micron.

EXAMPLE 2

This example described the preparation of a dense body of tungsten carbide bonded with 20% cobalt. A one-gallon steel mill is charged with 14,000 parts of the grinding medium of Example 1.

The mill is then charged with 1800 parts of fine tungsten carbide powder and 1160 parts of acetone. The tungsten carbide powder has a specific surface area of 0.66 square meter per gram, as determined by the nitrogen adsorption method. The powder consists of dense aggregates in the size range of 2 to 10 microns, the aggregates being comprised of tungsten carbide grains in the size range from 0.5 to 2 microns. The mill is then tumbled on a roller in the manner described in Example 1, for 2 days. At the end of 2 days milling, 450 parts of cobalt powder is added and milling continued for 3 more days. The slurry of cobalt-tungsten carbide is then dried according to the procedure described in Example 1.

The specific surface area of this powder is 2.5 square meters per gram. This powder is then cold-pressed isostatically at 60,000 p.s.i. by the procedure of Example 1. The pressed sample is subsequently sintered in a furnace which is evacuated to a pressure of $1 \times 10^{-4}$ torr. Prior to reaching the final sintering temperature, the samples are degassed slowly by heating to 1050° C. at a uniform rate of about 5° C. per minute. The final heating rate is about 70° C. per minute and the sample is held at the maximum sintering temperature of 1380° C. for 5 minutes. After the 5-minute hold, the furnace is cooled to about 800° C. within a 4-minute period and then cooled to room temperature.

The resulting sintered billet has a transverse rupture strength of 540,000 p.s.i. and a hardness of 87.2 Rockwell A. The sample has a low porosity (A-1 on the ASTM scale) and a uniform grain size and cobalt distribution.

UTILITY

The process of this invention is used for preparing unusually fine-grained, dense compacts of high strength and toughness. Bodies of tungsten carbide bonded with cobalt made by this invention are useful as tools for cutting metals, particularly in operations where conventional sintered cobalt-bonded carbides tend to chip, such as in milling hard steel alloys.

I claim:

1. A process for making a dense strong body of cobalt and tungsten carbide comprising the steps of:

(1) heating under vacuum a body, consisting essentially of 3 to 25% by weight of cobalt and 97 to 75% by weight of tungsten carbide and having a density in excess of 30% of theoretical, to a temperature in the range of from 1100° C. to a temperature just below the eutectic temperature of the composition, at a rate of not more than 10° C. per minute.

(2) thereafter, raising the temperature to $T_s$ at a rate of $R_s$ while maintaining the body under vacuum, where:

$$T_s = \left[\left(\frac{6.500 - \log_{10}(M-0.300)}{0.0039}\right) \pm 50\right] ° C.$$

$R_s = [(1.25M+45) \pm 10]$ ° C. per minute, and
    $M$ = the percent by weight of cobalt based on the weight of cobalt and tungsten carbide;

(3) maintaining, under vacuum, temperature $T_s$ for a period of time not exceeding 10 minutes; and (4) cooling the body from $T_s$ to 800° C. in an oxygen-free atmosphere in a period of time of from 5 to 30 minutes.

2. A process for making a dense, strong body of cobalt and tungsten carbide comprising the steps of:

(1) preparing an intimate powder mixture of cobalt and tungsten carbide having a specific surface area of from 1 to 7 square meters per gram and an oxygen content of less than 1.0% by weight, said mixture consisting essentially of:

(a) 3 to 25% by weight of cobalt having an average particle size in the range of from 0.1 to 5 microns and (b) 97 to 75% by weight of tungsten carbide having an average particle size in the range of from 0.1 to 2 microns;

(2) compacting said mixture under a pressure of from 1000 to 100,000 p.s.i. to a coherent body having a density in excess of 30% of theoretical;

(3) degassing the body under vacuum by raising the temperature from the cold-pressing temperature to a temperature in the range of from 1100° C. to a temperature just below the eutectic temperature of the composition, at a rate of not more than 10° C. per minute;

(4) thereafter, raising the temperature to $T_s$ at a rate of $R_s$ while maintaining the body under vacuum, where:

$$T_s = \left[\left(\frac{6.500 - \log_{10}(M-0.300)}{0.0039}\right) \pm 50\right] ° C.$$

$R_s = [(1.25M+45) \pm 10]$ ° C. per minute, and
    $M$ = the percent by weight of cobalt based on the weight of cobalt and tungsten carbide;

(5) maintaining, under vacuum, temperature $T_s$ for a period of time not exceeding 10 minutes; and (6) cooling the body from $T_s$ to 800° C. in an oxygen-free atmosphere in a period of time of from 5 to 30 minutes.

3. The process of claim 2 wherein the mixture consists essentially of:

(a) 6 to 20% by weight of cobalt and
    (b) 94 to 80% by weight of tungsten carbide.

4. The process of claim 2 wherein the average particle size of the tungsten carbide is in the range of 0.1 to 1.0 micron.

5. The process of claim 2 wherein the average particle size of the cobalt is in the range of 0.1 to 1.0 micron.

6. The process of claim 2 wherein the coherent body is cold-pressed in step 2 until it has a density in excess of 50% theoretical.

7. The process of claim 2 wherein the coherent body is cold-pressed in step 2 until it has a density in excess of 60% of theoretical.

8. The process of claim 2 wherein the period of time in step 5 does not exceed 5 minutes.

9. The process of claim 2 wherein the period of time in step 6 is from 5 to 10 minutes.

10. A process for making a dense, strong body of cobalt and tungsten carbide comprising the steps of:

(1) preparing an intimate powder mixture of cobalt and tungsten carbide having a specific surface area of from 2 to 5 square meters per gram and an oxygen content of less than 0.5% by weight, said mixture consisting essentially of:
 (a) 6 to 20% by weight of cobalt having an average particle size in the range of from 0.1 to 1.0 micron and
 (b) 94 to 80% by weight of tungsten carbide having an average particle size in the range of from 0.1 to 1.0 micron;

(2) compacting said mixture under a pressure of from 1,000 to 100,000 p.s.i. to a coherent body having a density in excess of 60% of theoretical.

(3) degassing the body under vacuum by raising the temperature from the cold-pressing temperature to a temperature in the range of from 1100° C. to a temperature just below the eutectic temperature of the composition at a rate of not more than 10° C. per minute;

(4) thereafter raising the temperature to $T_s$ at a rate of $R_s$ while maintaining the body under vacuum, where:

$$T_s = \left[ \left( \frac{6.500 - \log_{10}(M - 0.300)}{0.0039} \right) \pm 50 \right] \degree C.$$

$R_s = [(1.25M + 45) \pm 10] \degree$ C. per minute, and
$M$ = the percent by weight of cobalt based on the weight of cobalt and tungsten carbide;

(5) maintaining under vacuum, temperature $T_s$ for a period of time not exceeding 5 minutes; and (6) cooling the body from $T_s$ to 800° C. under vacuum in a period of time of from 5 to 10 minutes.

References Cited

UNITED STATES PATENTS

| | | | |
|---|---|---|---|
| 873,745 | 12/1907 | Haynes | 75—171 |
| 1,057,423 | 4/1913 | Haynes | 75—171 |
| 1,338,132 | 4/1920 | Honda | 75—171 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke | 29—182.7 |
| 2,731,711 | 1/1956 | Lucas | 29—182.8 |

FOREIGN PATENTS 1,041,958    9/1966    Great Britain.

OTHER REFERENCES

Metals Handbook, 1948 edition, p. 63; American Society for Metals, Novelty Park, Ohio.

CARL D. QUARFORTH, Primary Examiner

A. J. STEINER, Assistant Examiner

U.S. Cl. X.R.

75—211, 214, 227